United States Patent
Mandavia et al.

(10) Patent No.: US 12,045,119 B2
(45) Date of Patent: Jul. 23, 2024

(54) TECHNIQUES FOR DETECTING OUTAGES OF AN EXTERNAL SYSTEM

(71) Applicant: Amazon Technologies, Inc., Seattle, WA (US)

(72) Inventors: Nivea Guru Mandavia, Sterling, VA (US); Ivan Chen, Seattle, WA (US); Yuwei Jiang, Seattle, WA (US); Manpreet Arora, Seattle, WA (US); Bhavya Gupta, Delhi (IN); Bharath Shive Gowda, Bothell, WA (US); Fnu Himanshi, Bothell, WA (US); Cheng Chen, Richmond (CA)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 17/465,638

(22) Filed: Sep. 2, 2021

(65) Prior Publication Data

US 2023/0068032 A1    Mar. 2, 2023

(51) Int. Cl.
*G06F 11/00*    (2006.01)
*G06F 11/07*    (2006.01)
*G06N 20/00*    (2019.01)

(52) U.S. Cl.
CPC ...... *G06F 11/0751* (2013.01); *G06F 11/0709* (2013.01); *G06N 20/00* (2019.01)

(58) Field of Classification Search
CPC ............ G06F 11/0751; G06F 11/0709; G06F 11/0754; G06F 11/0757; G06F 11/076; G06F 11/0712; G06F 11/3006; G06F 11/301; G06F 11/3065; G06F 11/3075; G06F 11/3089; G06F 11/3466; G06F 11/3438

See application file for complete search history.

(56) References Cited

U.S. PATENT DOCUMENTS

| 2015/0227409 A1 | 8/2015 | Ricken et al. |
| 2019/0034254 A1* | 1/2019 | Nataraj ............... G06F 11/0709 |
| 2021/0224178 A1 | 7/2021 | Singh et al. |

FOREIGN PATENT DOCUMENTS

| EP | 3312725 A2 | 4/2018 |
| WO | 2019/13086 A1 | 11/2019 |
| WO | WO-2020024456 A1 * | 2/2020 ........ G06Q 10/06375 |

OTHER PUBLICATIONS

PCT/US2022/041353, "International Search Report and Written Opinion", Dec. 15, 2022, 13 pages.

* cited by examiner

*Primary Examiner* — Katherine Lin
(74) *Attorney, Agent, or Firm* — Kilpatrick Townsend & Stockton LLP

(57) ABSTRACT

System and methods are provided for detecting, tracking, and managing outages of transaction processors. An indication is received indicating a potential outage associated with a transaction processor computer configured to process transactions of an online retail website. The indication can be received from a threshold monitoring service and/or from a machine-learning detection system. A computing service can be initiated to confirm and track the outage over time. An outage may include a number of situations in which the transaction processor fails to process transactions according to a set of predefined processing parameters. If the outage spans a particular time period, the service can perform a number of remedial actions (e.g., notifying an administrator of the outage, etc.).

18 Claims, 7 Drawing Sheets

US 12,045,119 B2

TECHNIQUES FOR DETECTING OUTAGES OF AN EXTERNAL SYSTEM

BACKGROUND

It has become commonplace for users to conduct online transactions from online retail websites. These transactions can be processed by transaction processor computers. However, it can be difficult to determine when the transaction processor is experiencing an outage such that the transactions are no longer being processed according to predefined parameters. Failing to detect these outages can negatively impact user experience at the online retail website. Embodiments of the invention discussed herein address these and other problems, individually and collectively.

BRIEF DESCRIPTION OF THE DRAWINGS

Various embodiments in accordance with the present disclosure will be described with reference to the drawings, in which.

DETAILED DESCRIPTION

Figure 1:
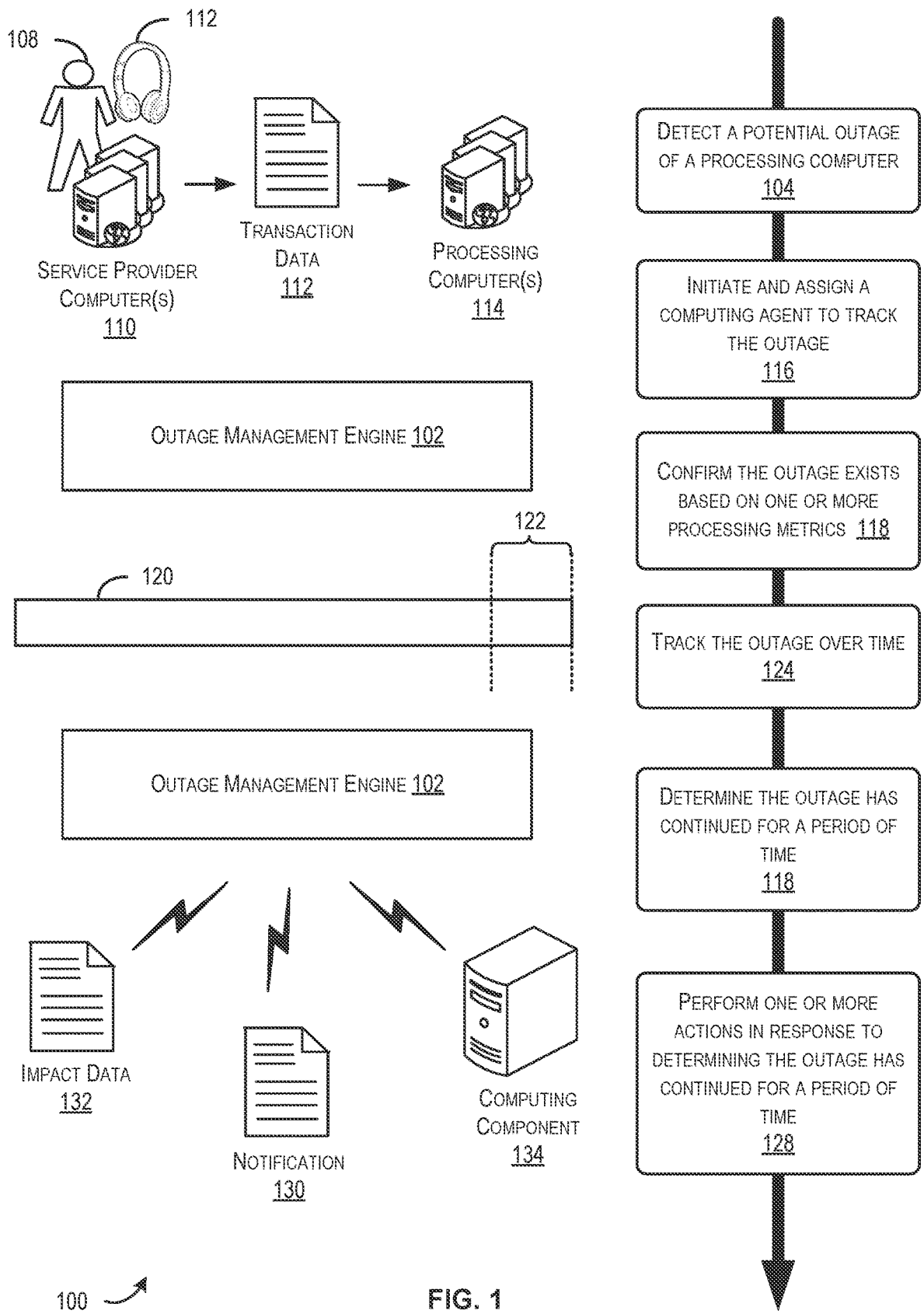
FIG. 1 illustrates a flow for detecting and managing a processor outage utilizing an outage management engine, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to detecting various outages of transaction processors associated with an online retail website. In some embodiments, the transaction processors may be configured to process transactions initiated at the online retail website (e.g., transactions such as purchases, rentals, leases, etc. of various items offered for consumption). In some embodiments, the transactions may be initiated via an assortment of computing services (e.g., a grocery service, a media streaming service, an electronic catalog service, and the like) associated with the website provider. A management system (e.g., an outage management engine) is disclosed that includes a detection module. The detection module can be configured to identify a potential outage of one or more transaction processors (e.g., financial institutions configured to process payment transactions) based at least in part on utilizing a machine-learning model trained with semi-supervised techniques and/or a threshold-monitoring service. The detection module, upon identifying a potential outage, can spin up a computing agent (e.g., a virtual computing resource such as a virtual machine). The computing agent can periodically poll a metrics service that is configured to provide metrics regarding the transaction processing of one or more transaction processors. The computing agent may be configured to identify when the transaction processor is failing to process said transactions within a predefined set of processing parameters. The outage can be tracked by the computing agent over time and, if the outage persists for some period of time, the computing agent may take a number of actions to mitigate the effects of the outage.

Utilizing the aspects described herein, outages of a transaction processor may be detected by the service provider such that the system may be improved as a whole. Conventionally, outages of a transaction processor (e.g., an unusual amount of failures, no approvals at all, transactions that take an unusually long period of time to process, etc.) could go undetected by the service provider since previous systems typically did not tailor failure monitoring to the transaction processor. Subsequent transactions would continue to be sent to the transaction processor with little hope of success and/or improvement over the current conditions. This could result in unusually long wait times for transaction completion as the transaction processor may get increasingly bogged down and, in some cases, users may not be able to conduct the transaction at all. This creates frustration for the users of the website resulting in a diminished user experience.

The user experience of the users of the online retail website may be improved through detecting these outages. For example, if a transaction processor is experiencing an outage, the system may direct pending and/or subsequent transactions to a different transaction processor (e.g., one that is not currently experiencing an outage). The wait times for pending transactions may be reduced from what they would have been originally since these subsequent transactions are redirected to a different processor rather than overloading the transaction processor that is already struggling. As another example, the system, upon detecting an outage, may notify administrators (e.g., administrators associated with an external system such as the transaction processing system) and/or suggest an action (e.g., reboot your server) to bring about quicker resolution to the outage. Additionally, using the techniques disclosed herein, the system may be configured to differentiate between internal errors (e.g., errors in code of a particular section/department/service of the website) and outages of the transaction processor, such that the appropriate party may be notified of the issue. Still further, the detection functionality disclosed herein may be provided while leaving much of the previous system's functionality intact.

Moving on to FIG. 1 which illustrates a flow 100 for detecting and managing a processor outage utilizing an outage management engine (e.g., the outage management engine 102), in accordance with at least one embodiment. A "processor outage" (also referred to herein as "an outage," for brevity) is intended to refer to a scenario in which a transaction processor (e.g., a financial institution configured to process financial transactions) fails to process data in accordance with one or more predefined parameters. By way of example, a predefined agreement may exist between a service provider (e.g., a provider of an online retail website) and a transaction processor in which the transaction processor has agreed to process at least some number of transactions in a given time period (e.g., 100 transactions a minute, 500 transactions per minute, etc.) or, as another example, to provide a response to a transaction request within a particular period of time (e.g., one second, five seconds, etc.). Previous systems were unable to track whether the transaction processor was fulfilling these requirements to determine when an outage occurred, when an outage resolved, how extensive the outage was, how to respond to the outage to mitigate the impact, and the like.

The flow 100 may begin at 104, where a potential outage of a processing computer (e.g., processing computer(s) 106) may be detected. The processing computer(s) 106 may be owned and/or operated by or on behalf of a transaction processor, thus, the processing computer(s) 106 may be configured to process financial transactions (also referred to as "transactions" for brevity) of an online retail website. By way of example, a user 108 may peruse an online retail website hosted by the service provider computer(s) 110 to search for item 112 (e.g., a pair of headphones). Although item 110 is depicted as a tangible item, intangible items may also be procured from the online retail website. Upon initiating a transaction for procuring the item, the service provider computer(s) 110 may transmit transaction data 112 to processing computer(s) 114. Processing computer(s) 114 may be associated with a transaction processor. In some embodiments, the transaction data 112 may include any suitable combination of one or more identifiers associated with a corresponding item, shipping information, taxes, a price corresponding to an item, a total price for the order, payment data (e.g., account number, expiration date, card verification value, routing number, etc.), and the like. In some embodiments, the processing computer(s) 114 may be configured to utilize the transaction data 112 to generate a payment transaction with an issuer associated with the payment data. The processing computer(s) 114 may be configured to exchange data with the issuer system in order to effectuate a payment transaction on behalf of the user 108.

In some embodiments, the potential outage may be detected based at least in part on a machine-learning model that has been previously trained to identify potential outages and/or a threshold monitoring service. In some embodiments, the machine-learning model and/or the threshold monitoring service may be provided as part of the outage management engine 102 of the machine-learning model and/or threshold monitoring service may be external to the outage management engine 102 but communicatively coupled to the outage management engine 102 in order to provide the outage management engine 102 with input. Example techniques for training the machine-learning model will be discussed in further detail with respect to FIG. 2. In some embodiments, the threshold monitoring service may be configured to utilize a configuration file that specifies one or more predefined thresholds that are to be monitored. By way of example, one such threshold may be used to specify a minimum number of transactions that are to be processed within a predefined period of time (e.g., 1 minute). The threshold provided in the configuration file may be specific to a transaction processor. That is, the configuration file may specify different thresholds for different transaction processors.

At 116, a computing agent may be initiated and assigned to track the potential outage. The computing agent may be a separate process configured to execute an instance of the outage management engine 102. In some embodiments, the computing agent may be a virtual machine configured to execute an instance of the outage management engine 102.

Thus, there may be any suitable number of instances of the outage management engine 102 each configured to track one or more potential outages.

At 118, as part of tracking the outage, the outage management engine 102 may be configured to execute operations to confirm the existence of the outage. In some embodiments, confirming the existence of the outage may include calculating or otherwise obtaining one or more processing metrics corresponding to a number of historical transactions 120. In some embodiments, the one or more processing metrics (e.g., a number of approved transactions, a number of declined transactions, a number of pending transactions that have neither been approved nor denied yet, a latency value quantifying a time interval needed for processing a transaction, a risk assessment score for one or more transactions, or the like) may be utilized to assess the transaction processing of the processing computer(s) 114 against predefined thresholds associated with the corresponding transaction processor. In some embodiments, only a portion of the historical transactions 120 (e.g., portion 122 including the transactions initiated within the last 5 minutes, 3 minutes, or the like) are used to calculate the one or more processing metrics. In some embodiments, the outage management engine 102 may be configured to calculate the processing metrics and/or the outage management engine 102 may obtain at least one of those processing metrics from a separate metrics service configured to calculate those metrics from a particular set of transactions (e.g., transactions initiated in the last 30 seconds, 5 minutes, etc.). In some embodiments, if the one or more processing metrics breach a predefined threshold (e.g., meet and/or exceeds a threshold specifying a lower limit, meets and/or falls under a threshold specifying a upper limit, etc.), the outage of the processing computer(s) 114 can be confirmed.

At 124, the outage may be tracked over time. In some embodiments, the outage management engine 102 may be configured to periodically determine new processing metrics. By way of example, the outage management engine 102 may be configured to obtain new processing metrics every 3 minutes, 5 minutes, or the like. In some embodiments, the frequency at which the outage management engine 102 calculates such metrics may be predefined and/or the outage management engine 102 may be configured to generate or otherwise obtain such metrics according to a predetermined schedule.

At 126, the outage management engine 102 may determine that the outage of the processing computer(s) 114 has continued for a period of time. For example, the outage management engine 102 may maintain a record that indicates when the outage was first detected (referred to as an "outage start time"). A current time may be compared to the outage start time to determine a time interval quantifying a difference between the two.

At 128, the outage management engine 102 may be configured to execute one or more operations upon determining that the time interval for which the outage has continued has breached a predefined time threshold. In some embodiments, the specific operations to be performed may be predefined and identified from a configuration file that includes predefined processing parameters associated with one or more transaction processors. For example, the configuration file may include one set of operations to be performed when an outage experienced by a particular transaction processor exceeds a first time threshold (e.g., 30 minutes) and a second set of operations to be performed when the outage exceeds a second time threshold (e.g., one hour).

By way of example, the outage management engine 102 may be configured to generate and transmit a notification (e.g., notification 128) to one or more entities (e.g., an administrator of the processing computer(s) 114) when the outage continues for longer than specified by the first time threshold. The outage management engine 102 may be configured to perform different operations (e.g., generate impact data 130 quantifying an impact of the outage on the service provider computer(s) 110, transmitting outage data to a computing component 132 (e.g., a component configured to manage one or more outage records that are accessed and/or assigned to software developers and/or administrators assigned to resolve the outage) based at least in part on what processing parameter (e.g., a processing threshold) has been breached. In some embodiments, transmitting the outage data to the computing component 132 may cause a record/ticket corresponding to the outage to be generated and stored in memory for subsequent use. In some embodiments, different transaction processors may be associated with different operations and/or a different processing parameters.

Figure 2:
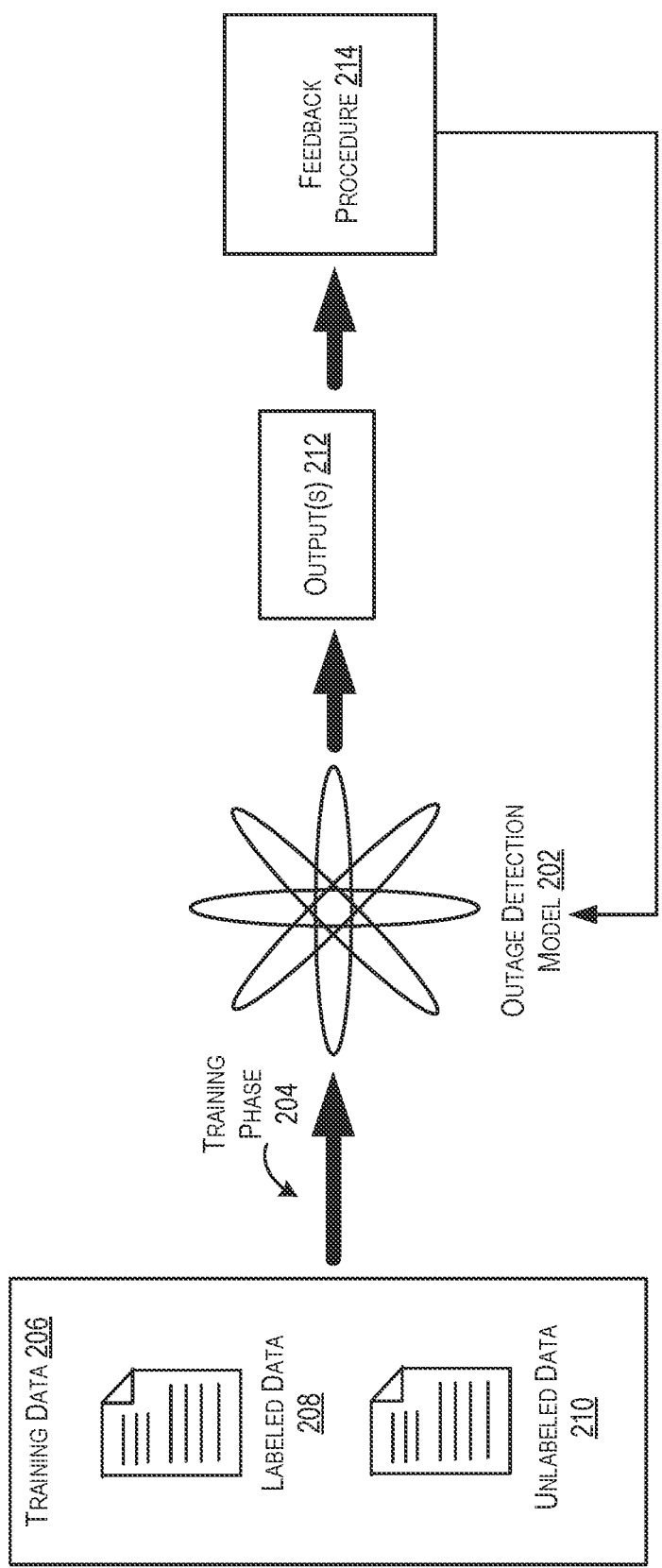
FIG. 2 illustrates an example method for training a machine-learning model to detect outages, in accordance with at least one embodiment.

FIG. 2 illustrates an example method 200 for training a machine-learning model (e.g., the outage detection model 202) to detect potential outages, in accordance with at least one embodiment. The flow 200 may be performed by the outage detection engine 102 of FIG. 1 and/or, at least partially, by a computing component separate and distinct from the outage detection engine 102.

A training phase may be executed at 204 to train the outage detection model 202 to detect outages from subsequent input. Training the outage detection model 202 may utilize training data 206 and any suitable combination of one or more machine-learning algorithms. Each entry of training data 206 may include any suitable number of transaction data instances corresponding to a particular time interval (e.g., a number or all of the transaction data corresponding to transactions that occurred within a five minute time interval) and/or any suitable number of processing parameters (e.g., one or more metric values) corresponding to transaction instances data processed over a given time period (such as over a five-minute time period, over a ten-minute time period, etc.). An example of a processing parameter of a set of transaction data instances may include, but is not limited, a number of approved transactions over the time interval, a number of declined transactions over the time interval, a number of pending transactions (neither approved nor declined) over the time interval, one or more latency values specifying a length of time between transaction request (e.g., from the service provider computer(s) 110 of FIG. 1) to transaction response (e.g., provided by the processing computer(s) 114 of FIG. 1), an average latency value corresponding to an average of respective latency values associated with the transactions of a given entry, and/or any suitable metric that describes an attribute of transaction processing by the processing computer(s) 114. The machine-learning algorithm used to train outage detection model 202 may utilize any suitable combination of supervised learning, unsupervised learning, and/or semi-supervised learning (e.g., a mix of supervised and unsupervised learning).

In supervised learning, the training data used to train a model may be labeled or otherwise annotated to indicate input/output pairs. That is, a positive example of an approved input/output pair that has been deemed to be an acceptable pairing and/or a negative example of an input/output pairing that has been deemed to be in error. Some portion of training data 206 may include labeled data 208. Labeled data 208 may include examples that are labeled as corresponding to an outage and other examples that are labeled as not corresponding to an outage. Each example may include any suitable number of transaction data instances corresponding to transactions performed within a given time interval. Using the labeled data 208 and a supervised machine-learning algorithm, an inferred function may be generated that maps the example inputs (e.g., a set of transaction data instances) of the labeled data 208 to the corresponding outputs of the labeled data 208 (e.g., an "outage" label or a "no outage" label). The outage detection model 202 may be an example of one such function.

In some embodiments, unsupervised machine-learning algorithms may be utilized to train outage detection model 202. Unsupervised machine-learning algorithms are configured to learn patterns from untagged data. In some embodiments, the training phase 204 may utilize unsupervised machine-learning algorithms to generate outage detection model 202. For example, the training data 204 may include unlabeled data 210. Unlabeled data 210 may be utilized, together with an unsupervised learning algorithm to segment the entries of unlabeled data 210 into groups. The unsupervised learning algorithm may be configured to cause similar entries to be grouped together in a common group. An example of an unsupervised learning algorithm may include clustering methods such as k-means clustering, DBScan, and the like. In some embodiments, the unlabeled data 210 may be clustered with the labeled data 208 such that unlabeled instances of a given group may be assigned the same labeled as other labeled instances within the group.

As another example, an unsupervised machine-learning algorithm may be configured to assume that a majority of examples of the training data 206 are normal (e.g., not indicative of an outage). The unsupervised machine-learning algorithm may be configured to search for an example within the training data 206 that seems to fit least to the remainder of the training data. This example may then be assumed to be indicative of an outage.

As yet another example, training phase 204 may include training the outage detection model 202 using semi-supervised techniques. Semi-supervised learning is similar to unsupervised learning but which utilizes a relatively small amount of labeled data. In the example provided in FIG. 2, the training data 206 may include labeled data 208 and unlabeled data 210. In some embodiments, labeled data 208 may include any suitable number of data entries, where each data entry includes transaction data corresponding to a number of transactions (e.g., ten transactions, twenty transactions, any suitable number of transactions corresponding to a particular time interval such as five minutes, etc.) and a label indicating that the transaction data corresponds to an outage or that the transaction data does not correspond to an outage. In some embodiments, unlabeled data 210 may include any suitable number of entries, each entry including any suitable number of transaction data instances corresponding to any suitable number of transactions (e.g., transactions initiated in a given time interval such as a five-minute time interval, a ten-minute time interval, etc.).

In some embodiments, using a semi-supervised anomaly detection technique, the outage detection model 202 may be constructed to represent normal behavior given labeled data 206 (representing a set of normal (not indicative of an outage) data examples, each example of the labeled data 208 including a set of transaction data instances representing the transactions from a given period of time) and then test the likelihood of a test instance of the unlabeled data 208 could be generated by the outage detection model 202. If the test example is determined to be unlikely (e.g., under a predefined likelihood threshold such as 90% likely) to have been generated by the outage detection model 202, then the test example may be assigned a label indicating the test example is anomalous (indicating the transaction data contained in the test example is indicative of an outage). Conversely, if the test example is determined to be likely (e.g., equal to or exceeding a predefined likelihood threshold such as 90% likely) to have been generated by the outage detection model 202, then the test example may be labeled "normal" or otherwise not indicative of an outage.

Any suitable portion of the training data 206 may be utilized during the training phase 204 to train the outage detection model 202. For example, 70% of the training data 206 may be utilized to train the outage detection model 202. Once trained, or at any suitable time, the outage detection model 202 may be evaluated to assess the quality (e.g., accuracy) of the model. By way of example, a portion of the examples of training data 206 may be utilized as input to the outage detection model 202 to generate output(s) 212 (e.g., any suitable number of outputs corresponding to the number of inputs utilized from training data 206). If an example of the labeled data 208 was provided as input, the corresponding output may be compared to the known label. If the output matches the label, the label may be deemed accurate for the example. Any suitable number of labeled examples may be utilized and a number of accurate labels may be compared to the total number of examples provided to determine an accuracy value for the outage detection model 202 that quantifies a degree of accuracy for the model at generating accurate outputs. For example, if 90 out of 100 of the input examples generate output that matches the known label, the outage detection model 202 may be determined to be 90% accurate.

In some embodiments, as the output detection model 202 is utilized for subsequent inputs (e.g., a set of transaction data instances), the subsequent output generated by the outage detection model 202 may be added to corresponding input and used to retrain and/or update the outage detection model 202. In some embodiments, the example may not be used to retrain or update the model until feedback procedure 214 is execute. In feedback procedure 214 the example and the corresponding output generated for the example by outage detection model 202 is presented to a user and the user identifies whether the label (e.g., indicative of an outage, not indicative of an outage) is correct for the given example.

By way of example, a subsequent set of transaction data instances corresponding to any suitable number of transactions initiated from a retail website within a given time interval such as a five-minute interval. Each data instance may include any suitable payment data, order information, or the like and one or more processing parameters corresponding The process 200 may be performed any suitable number of times at any suitable interval and/or according to any suitable schedule such that the accuracy of outage detection model 202 is improved over time.

Figure 3:
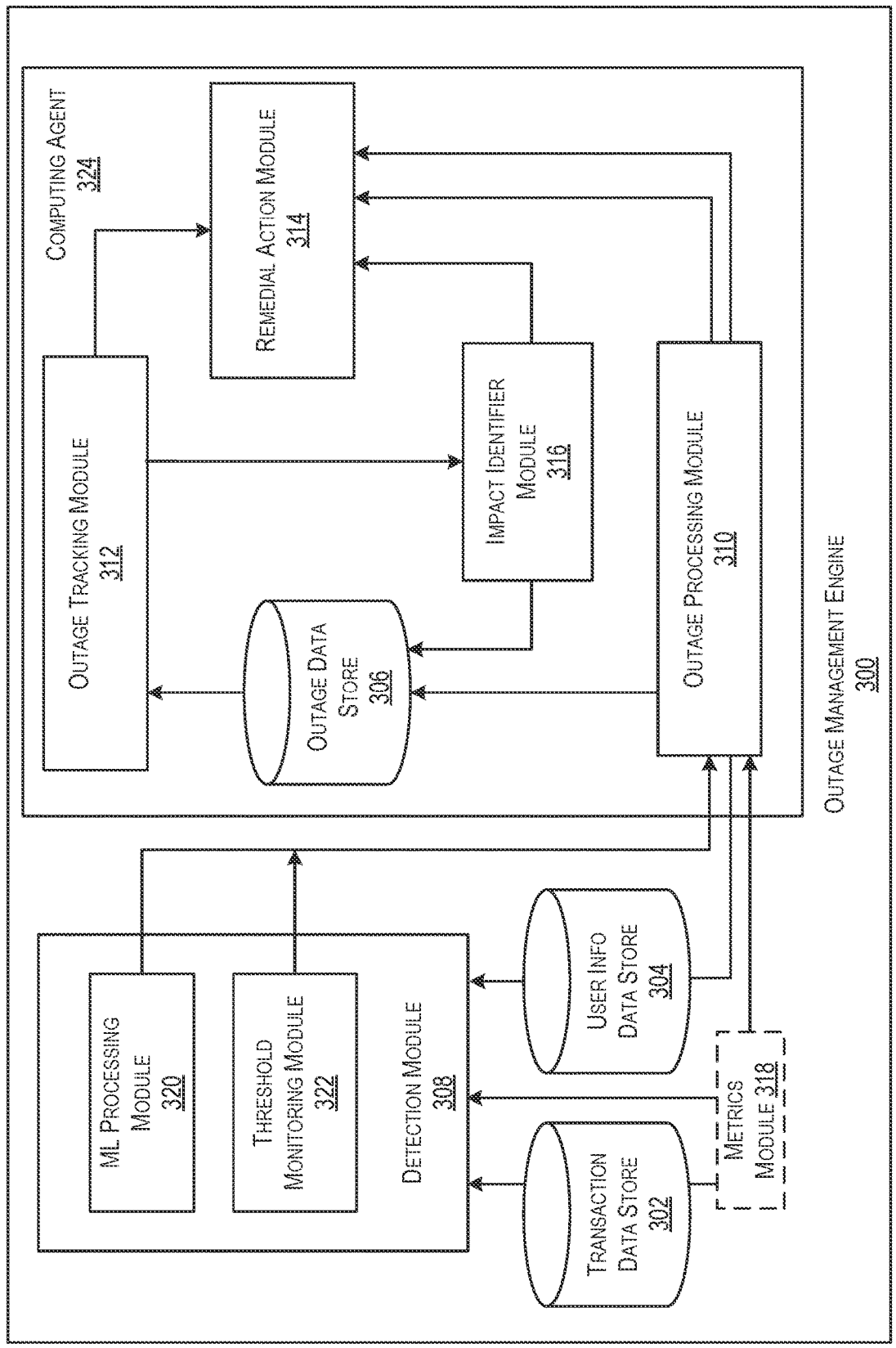
FIG. 3 is a schematic diagram of an example computer architecture for the outage management engine, including a plurality of modules that may perform functions in accordance with at least one embodiment.

FIG. 3 is a schematic diagram of an example computer architecture for the outage management engine 300 (an example of the outage management engine 102 of FIG. 1), including a plurality of modules that may perform functions in accordance with at least one embodiment. The modules may be software modules, hardware modules, or a combination thereof. If the modules are software modules, the modules can be embodied on a computer readable medium and processed by a processor in any of the computer systems described herein. It should be noted that any module or data store described herein, may be, in some embodiments, be a service responsible for detecting and/or managing outages corresponding to one or more transaction processors. The modules may be exist as part of the outage management engine 102, or the modules may exist as separate modules or services external to the outage management engine 102.

Figure 6:
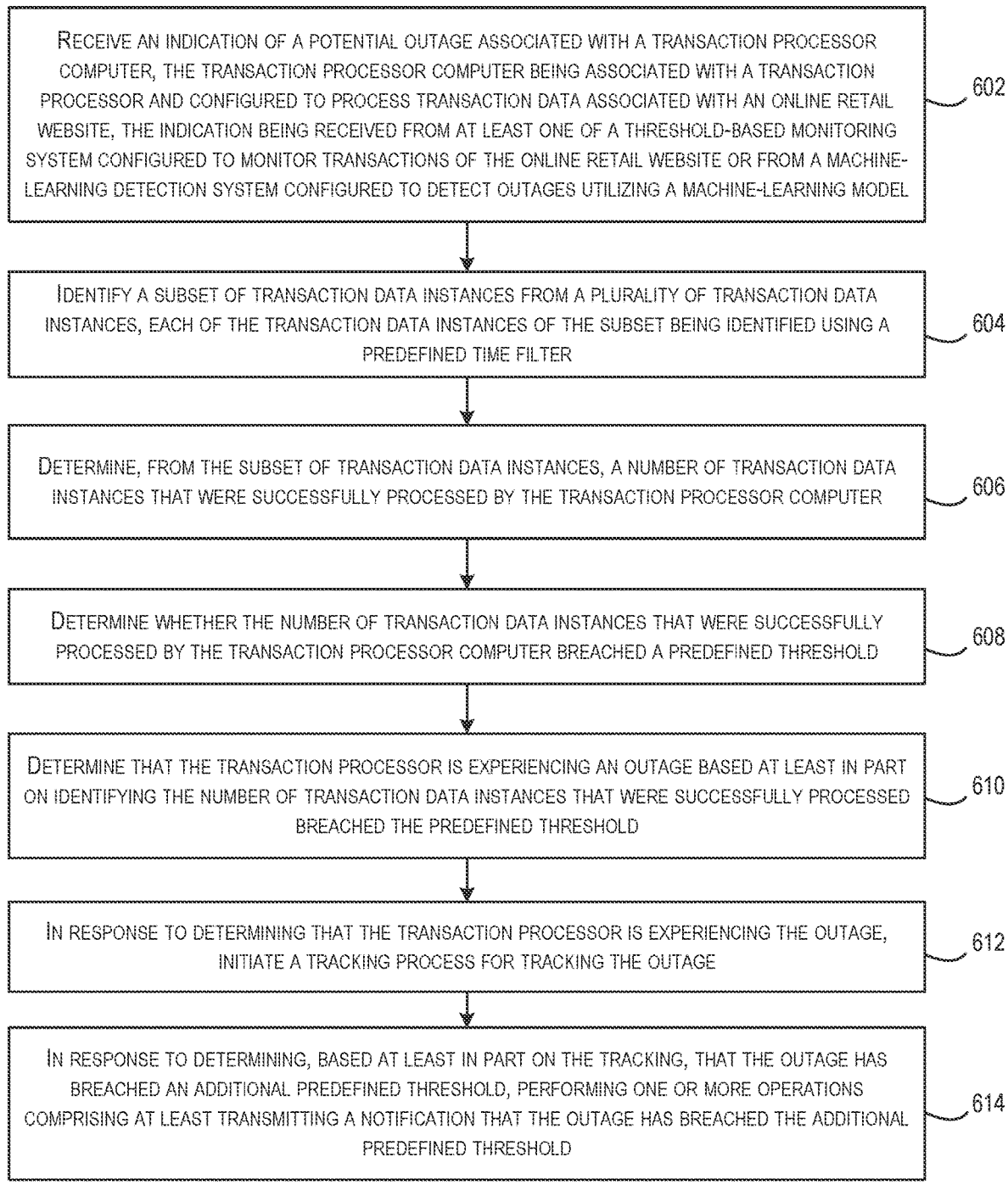
FIG. 6 is a flowchart illustrating an example method for detecting and managing a processing outage, in accordance with at least one embodiment.

In the embodiment shown in the FIG. 3, data stores such as transaction data store 302, user information data store 304, and outage data store 306 are shown, although data can be maintained, derived, or otherwise accessed from various data stores, either remote or local to the outage management engine 300, to achieve the functions described herein. The outage management engine 300, as shown in FIG. 6, includes various modules such as a detection module 308, an outage processing module 310, an outage tracking module 312, a remedial action module 314, and an impact identifier module 316. Some functions of the modules 308-316 are described below. However, for the benefit of the reader, a brief, non-limiting description of each of the modules is provided in the following paragraphs. In accordance with at least one embodiment, a process is enabled for detecting and responding to an outage of a transaction processor (e.g., an outage experienced by the processing computer(s) 114 of FIG. 1).

In at least one embodiment, the outage management engine 102 includes the detection module 308. The detection module 308, as depicted in FIG. 3, may be a part of the outage management engine 300 or the detection module 308 may be provided by a separate module and/or service external to the outage management engine 300. In some embodiments, the detection module 308 may be configured to obtain transaction data from the transaction data store 302, a data store configured to store transaction data corresponding to transactions that have been initiated in the past (also referred to as "historical transaction data"). By way of example, the detection module 208 may be configured to obtain any suitable number of transaction data instances corresponding to one or more transactions that were initiated within a given time period (e.g., within the last five minutes, ten minutes, etc.). In some embodiments, the detection module 208 may specify a transaction processor such that only transaction data instances corresponding to transactions handled by that transaction processor may be returned.

A transaction data instance may include transaction data such as a transaction identifier (e.g., an identifier that uniquely identifies the transaction), a requestor identifier, a transaction processor identifier indicating the requested transaction processor, payment data (e.g., account number, expiration date, card verification value, routing number, total price, etc.), item information of one or more items associated with the transaction (e.g., item identifiers, prices associated with the items, etc.), and a start time indicating a time at which the corresponding transaction was initiated (a time at which a transaction request was transmitted from the service provider computer(s) 110 of FIG. 1 to the processing computer(s) 114 of FIG. 1). Some transaction data instances (e.g., data instances corresponding to completed transactions which includes approved and/or declined transactions) may be associated with an end time indicating a time at which a response for the corresponding transaction was received, a latency value corresponding to a time between the start time and the end time, and a status indicator indicating whether the transaction was approved, declined, or neither approved nor declined (indicating a still pending transaction).

In some embodiments, processing parameters may be calculated from a set of transaction data instances and may include any suitable combination of: a total number of approved transactions, a total number of declined transactions, a total number of pending (neither approved nor declined) transactions, a latency value for each approved/declined transaction that specifies a processing time between the start time at which a transaction request was transmitted and an end time at which a response to the request was received, an average latency value indicating an average of the latency values of all completed transactions within a given time period, a risk assessment score, and the like. A risk assessment score, as referred to herein, may be a score that indicates a degree of financial risk of a given transaction in light of one or more risk factors (e.g., total amount of the transaction, the identity of the purchaser, the purchase history of the purchaser, shipping data associated with shipping the items of the transaction, etc.). The risk assessment scores discussed herein may be calculated based at least in part on a predefined algorithm and/or the risk assessment scores may be obtained through querying a risk assessment service (not depicted) configured to calculate such scores. The risk assessment service may be a part of the outage management engine 300 or may exist as a service external to the outage management engine 300. By way of example, the risk assessment service may be provided as part of the metrics module 318.

In some embodiments, the detection module 308 may calculate the processing parameters from the transaction data obtained from transaction data store 302. In other embodiments, an metrics module 318 may be utilized to obtain processing parameters. For example, the metrics module 318 may be configured to calculate the processing parameters from transaction data obtained from the transaction data store 302. Thus, the detection module 308 may request all the transaction data from a given time period (e.g., the last five minutes) and calculate the processing parameters itself, or it may query the metrics module 318 for the processing parameters associated with transactions initiated within that time period. In some embodiments, the detection module 308 and/or the metrics module 320 may be configured to generate processing parameters that are specific to transactions being processed by a particular transaction processor. In some embodiments, the detection module 308 and/or the metrics module 320 may be configured to generate a corresponding set of processing parameters for each transaction processor utilized.

The detection module 308 may include machine-learning (ML) processing module 320. In some embodiments, the ML processing module 320 may be configured to utilize the outage detection model 202 of FIG. 2. In some embodiments, the ML processing module 320 may be configured to execute the training phase 204 of FIG. 2 although in some embodiments, a separate module external to the outage management engine 300 may be utilized to train the outage detection module 202 of FIG. 2. The ML processing module 320 may be configured to provide as input to the outage detection model 202 any suitable combination of transaction data instances (e.g., transaction data corresponding to each of the transactions initiated within the last five minutes) and/or processing data corresponding to a set of transactions (e.g., the transaction initiated within the last five minutes). In some embodiments, if the outage detection model 202 indicates the input is indicative of an outage, the ML processing module 320 may be configured to trigger and/or invoke the functionality of the outage processing module 310.

The detection module 308 may include threshold monitoring module 322. The threshold monitoring module 322 may be a module or service configured to monitor the processing parameters calculated or otherwise obtained by the detection module 308 to determine if those processing parameters breach any predefined thresholds. By way of example, the threshold monitoring service can be configured to determine whether processing parameters of a given transaction processor have exceeded a set of predefined thresholds. These predefined threshold may differ by transaction processor or they may be universal to all transaction processors. As a non-limiting example, a predefined threshold for transaction processor T may indicate an outage may be occurring when the number of approved transactions falls below threshold x and/or the number of pending transactions exceeds threshold y, when x and y can be integers or percentages of the total number of transactions initiated in the given time period. The specific thresholds monitored by the threshold monitoring module 322 may be provided via one or more predefined configuration files and may be associated with any suitable number of transaction processors (one or more transaction processors). If the threshold monitoring module 322 detects a threshold has been breached (e.g., the number of approved transactions falls below threshold x, the number of pending transactions exceeds threshold y, etc.), it may be configured to trigger and/or invoke the functionality of outage processing module 310.

In some embodiments, invoking the functionality of the outage processing module 310 may include initiating and/or assigning computing agent 324 to the potential outage. By way of example, the detection module 308, the ML processing module 320, and/or the threshold monitoring module 322 may be configured to instantiate computing agent 324 (e.g., a virtual machine instance, a processing thread, etc.) and assign the computing agent 324 to specifically monitor a potential outage of a particular transaction processor. Any suitable number of computing agents may be executed at the same time, each being assigned to a different potential (or actual) outage. In some embodiments, a computing agent may be assigned to more than one transaction processor outage. Each computing agent may execute respective instances of modules 310-316 and outage data store 306. In some embodiments, outage data store 306 is implemented by a device that is external from but accessible to all of the computing agents.

In some embodiments, outage processing module 310 may be configured to process transaction data of a given transaction processor. In some embodiments, the outage processing module 310 may be configured to retrieve (e.g., from the transaction data store 302) a set of transaction data instances. In some embodiments, the outage processing module 310 may query the transaction data store for transaction data instances corresponding to transactions involving a particular transaction processor and occurring within a particular time interval (e.g., the last five minutes, the last ten minutes, the last 30 minutes, etc.). Alternatively, the outage processing module 310 may retrieve all transaction and filter those not involving the particular transaction processor for which the potential outage was detected. In some embodiments, particular time interval from which transactions may be retrieved may be predefined and/or user configurable (e.g., changeable through user input provided at an interface hosted by the outage management engine 300).

The outage processing module 310 may calculate processing parameters from the set of transaction data instances obtained from the transaction data store 302. In some embodiments, the outage processing module 310 may initially receive such processing parameters from the metrics module 318. The outage processing module 310 may generate an outage record corresponding to the outage and may store the transaction data instances and/or processing parameters within the record. The record may be stored within the outage data store 306. In some embodiments, the record may be associated with an identifier of the transaction processor such that a key (e.g., the identifier of the transaction processor) may be utilized to retrieve the record and with it the transaction data instances and/or processor parameters stored within the record. The outage processing module 310 may be configured to assign a start time to the outage using the current time. In some embodiments, if a module subsequently triggers another computing agent to track the outage, the outage processing module 310 of that computing agent can identify that an outage already exists (and is not labeled as being inactive) in the outage data store 306 and may terminate processing such that duplicate processing of a given outage is avoided. The outage processing module 310 may be further configured to trigger the functionality of the outage tracking module 312. In some embodiments, the outage processing module 310 may initiate periodic processing of the outage by the outage tracking module 312. For example, the outage tracking module 312 may set a reoccurring timer associated with the transaction processor and configured to cause the functionality of the outage tracking module 312 to be repeatedly called at time intervals corresponding to a predefined period of time (e.g., every 5 minutes, every 10 minutes, or the like) for as long as the outage is determined to be active.

The outage tracking module 312 may be configured to identify whether an outage is active or inactive. The outage tracking module 312 may be configured to obtain a predefined set of rules associated with the transaction processor. These rules may be stored in a mapping within outage data store 306, a data store that is accessible to the outage processing module 310. In some embodiments, the outage data store 306 may store any suitable number of rule sets corresponding to any suitable number of transaction processors. In some embodiments, these rules may relate to the same or different thresholds than those used for monitoring by the threshold monitoring module 322 The outage tracking module 312 may be called when the timer set by the outage processing module 310 expires. In some embodiments, the outage tracking module 312 may alternatively execute according to a predetermined periodicity and/or schedule to evaluate every outage corresponding to any outage record contained in the outage data store 306.

The outage tracking module 312 may be configured to retrieve the outage record from the outage data store 306 using an identifier corresponding to the timer and associated with the transaction processor. The outage tracking module 312 may be configured to set an indicator in the outage record to indicate the outage is active based at least in part on a comparison between the processing parameters of the record and the predefined set of rules associated with the transaction processor. For example, in some embodiments, the outage tracking module 312 may be configured to determine whether an outage exists (e.g., whether the outage is active). That is, whether the transaction processor is operating in an acceptable manner based at least in part on evaluating the processing parameters with respect to the predefined set of rules associated with the transaction processor. For example, a particular transaction processor may be expected to process n number of transactions within the given time interval (e.g., every 5 minutes). If the actual number of transactions falls below the threshold n, the outage tracking module 312 may determine an outage exists/is active. If the outage is determined to be active, the outage tracking module 312 may invoke the functionality of the outage processing module 310 to update the outage record (e.g., to retrieve a new set of transaction data corresponding to transaction occurring within the last 5 minutes, calculate and/or obtain the processing parameters corresponding to that set of transaction data, and update the outage records with any suitable portion of that data). If, at any time, the outage tracking module 312 determines that the outage is no longer active (e.g., the processing parameters no longer fail one or more of the predefined rules associated with the transaction processor), the outage tracking module 312 may set the indicator within the outage record to indicate the outage is no longer active. In some embodiments, the outage record may persist in the outage data store 306 for some time based at least in part on predefined rules for purging such data from the outage data store 306.

In some embodiments, the outage tracking module 312 may be configured to determine whether the outage record indicates a particular condition. By way of example, the outage tracking module 312 may be configured to ascertain whether the outage has continued for a time that exceeds a predefined time period (e.g., 30 minutes, an hour, etc.). In some embodiments, when the outage exceeds this time period, the outage tracking module 312 may be configured to invoke the functionality of the remedial action module 314.

In some embodiments, the outage tracking module 312 may be configured to assess a severity of the outage based at least in part on one or more of the processing parameters. By way of example, the processing parameters may include a risk assessment score indicating a degree of risk associated with the transaction data instances. If the risk assessment score is high (e.g., indicating a high degree of risk and/or a high amount of potential loss) the outage tracking module 312 may assign the outage a higher severity than otherwise assigned. A severity indicator may be included in the outage record. In some embodiments, the severity indicator may be default to a particular value indicating, for example, average severity. But the outage tracking module 312 may manipulate that indicator to indicate different degrees of severity based at least in part on a set of predetermined rules for assessing the severity of an outage. In some embodiments, the remedial action module 314 may take into account the severity of the outage such that the severity may modify the remedial action(s) taken than what would otherwise have been executed for less severe outages.

In some embodiments, the outage tracking module 312 may be configured to perform dynamic benchmarking. For example, a predefined threshold may be specified that indicates that, given a particular volume of transactions (e.g., 1,000, 400, etc.) over a given time (e.g., the time interval discussed above), x number of transactions (e.g., five, twenty, etc.) are allowed to fail. However, over time the outage tracking module 312 may identify a number of transactions that were declined in the given time window being evaluated and store that information in the outage record. Each time the outage tracking module 312 is called it can again identify the number of transactions that were declined such that the processing behavior of the transaction processor can be assessed over time. In some embodiments, if the outage tracking module 312 identifies that the transaction processor's actual behavior is different from the threshold (e.g., it typically is only processing n number of transactions (where n is less than x), the outage tracking module 312 may be configured to modify the predefined rule set to indicate a new threshold (e.g., n+1, etc.) for that transaction processor such that for subsequent evaluations, the new threshold is used. The same concept could be used to dynamically and automatically adjust thresholds for the number of approvals that are expected, the expected latency of a transaction, and the like. Thus, over time, the outage tracking module 312 can cause the thresholds it monitors to more closely match the actual behavior identified for the transaction processor through the tracking provided by the outage tracking module 312.

The remedial action module 314 may be configured to execute one or more predefined remedial actions depending on a predefined set of rules. By way of example, the remedial action module 314 may be configured to send a notification to one or more entities (e.g., an administrator of the transaction processor) to inform the entities of the outage when the outage has been active for at least 15 minutes. Additionally, or alternatively, the remedial action module 314 may be configured to send a notification to a different set of entities and/or to request an impact of the outage be determined when the outage has continued for over 30 minutes. The remedial action module 314 may generally perform a variety of operations for providing notifications (e.g., addressed and/or broadcasted notification such as emails, push notifications, SMS messages, or the like), for causing an impact of an outage to be identified, for causing a report detailing the impact of the outage to be generated, for causing one or more predefined actions to be executed (e.g., rebooting a particular server, transitioning transaction processor to an alternate transaction processor, etc.). For example, the remedial action module 314 can be configured to cause subsequent transactions to be transmitted to a different transaction process for a period of time (or until the outage of the previous transaction processor is no longer active). In some embodiments, then the outage is determined (e.g., by the outrage tracking module 312) to be inactive, the remedial action module 314 may be invoked to cause subsequent transaction to revert to being processed by the original transaction processor.

In some embodiments, the remedial action module 314 may be configured to utilize a severity indicator associated with the outage record to identify a particular remedial action to perform. In some embodiments, for example, a remedial action corresponding to an outage record with an indicator that indicates average severity may include waiting 30 minutes before notifying an administrator, while a remedial action executed for an outage with a higher severity level may cause a notification to be immediately sent to the administrator.

In some embodiments, the remedial action module 314 may be configured to identify transaction data instances of the outage that are still pending. In some embodiments, the remedial action module 314 may be configured to obtain historical user data corresponding to historical order and/or payment history associated with the user that initiated the transaction. This historical user data may be obtained from the user information data store 304. In some embodiments, the historical user data is associated with a user profile corresponding to the user. The remedial action module 314 may be configured to assess the historical user data to determine a reliability score that indicates, based on past orders, how reliable the user is to provide payment and/or a urgency score indicating a degree of urgency for shipping the items being purchased by the transaction. In some embodiments, based on any suitable combination of the reliability score and/or the urgency score, the remedial action module 314 may execute operations to cause the shipping of the item(s) corresponding to the transaction to proceed to shipment despite the fact the transaction is still pending with the transaction processor.

The impact identifier module 316 may be configured to use any suitable data of the outage record to identify various attributes of the outage such as total time of the outage, number of transactions affected, number of transactions delayed over expected transaction processing time period, number of transactions declined over an expected number of declined transactions, and the like. In some embodiments, the impact identifier module 316 may be configured to aggregate these attributes in an impact record which in turn may be stored in the outage data store 306 and/or transmitted to an suitable destination (e.g., to an administrator of the transaction processor, an administrator associated with the service provider computer(s) 110 of FIG. 1, etc.).

Figure 4:
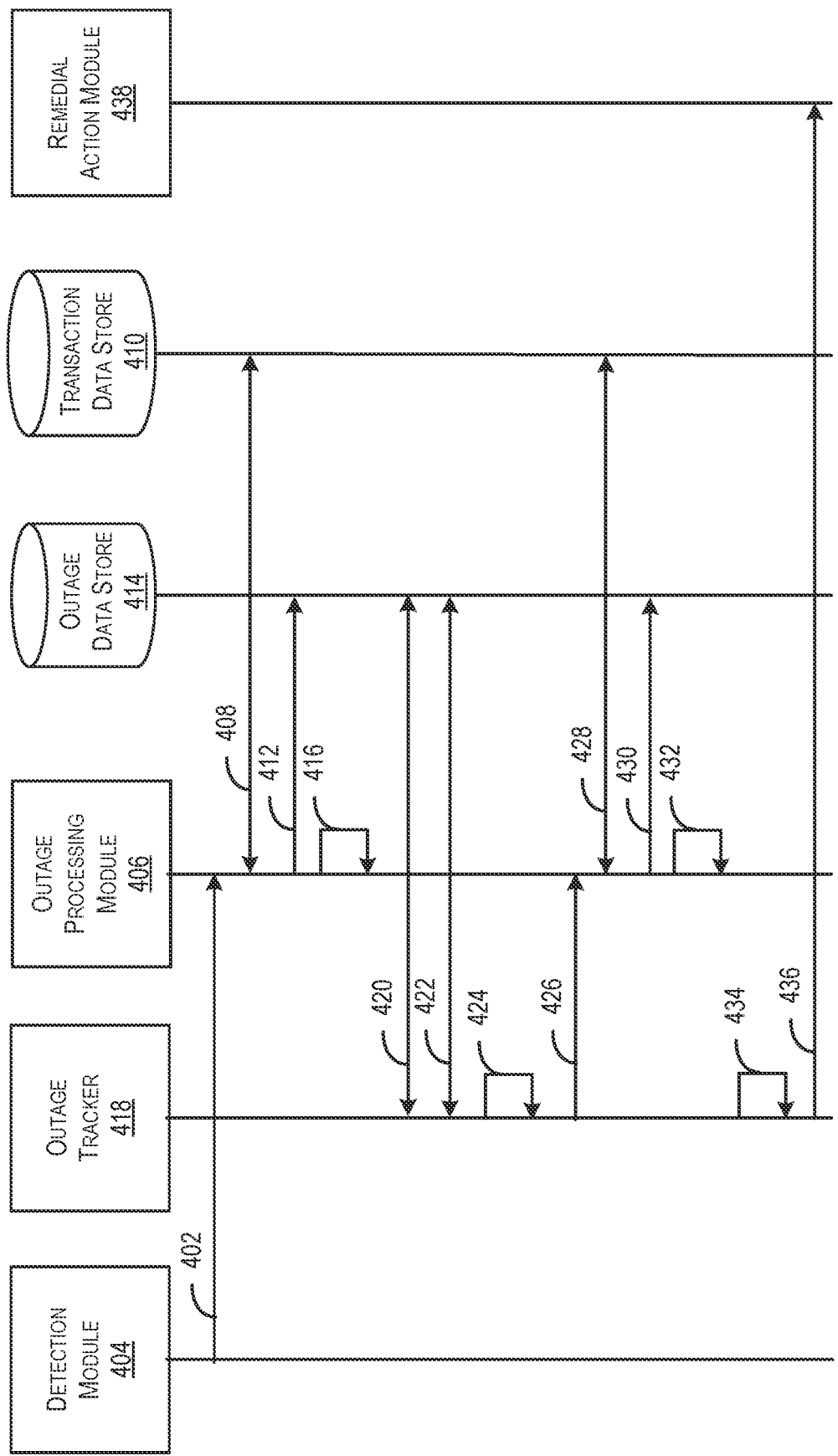
FIG. 4 illustrates an example protocol for tracking a processing outage, in accordance with at least one embodiment.

FIG. 4 illustrates an example flow 400 for tracking a processing outage, in accordance with at least one embodiment.

The flow 400 may begin at 402, where the detection module 404 (an example of the detection module 308 of FIG. 3) detects a potential outage corresponding to a particular transaction processor. By way of example, the outage detection module 202 of FIG. 2 may utilize input (e.g., transactions of the transaction processor occurring within the last 10 minutes) to generate output indicating a likelihood that the transaction processor is experiencing an outage (e.g., a value indicating a 95% likelihood that the transaction processor is experiencing an outage). Upon detecting the potential outage (as indicated by the model's output), the detection module 404 may invoke the functionality of outage processing module 406 (an example of the outage processing module 310 of FIG. 3). In some embodiments, invoking the functionality of outage processing module 406 may include instantiating an instance of the computing agent 324 of FIG. 3 and assigning the computing agent to the potential outage detected by the detection module 404.

At 408, the outage processing module 406 may retrieve one or more transaction data instances from the transaction data store 410 (an example of the transaction data store 302 of FIG. 3). The transaction data store 410 being a data store configured to store historical transactions initiated by the service provider computer(s) 110 of FIG. 1. In some embodiments, the outage processing module 406 may be configured to obtain the processing parameters discussed above corresponding to the transaction data instances obtained from the transaction data store 410. In some embodiments, the processing parameters are calculated by the outage processing module 406 from the transaction data instances, while in other embodiments, the processing parameters may be obtained from a separate service (e.g., the metrics service 318 of FIG. 3).

At 412, the outage processing module 406 may generate an outage record and store any suitable combination of the transaction data instances and/or the processing parameters obtained at 408 within the record. The record may then be associated with an identifier corresponding to the transaction processor and stored in outage data store 414 for subsequent use.

At 416, the outage processing module 406 may be configured to initiate a tracking process for tracking the outage. In some embodiments, initiating the tracking process may include setting a reoccurring timer to cause the functionality of the outage tracker 418 (an example of the outage tracking module 312 of FIG. 3) to be invoked at a set periodicity (e.g., every 5 minutes, every ten minutes, every hour, etc.).

At 420, the functionality of the outage tracker 418 may be triggered due to expiration of the timer set by the outage processing module 406. The outage tracker 418 may identify whether any outages exist (e.g., at all, or for the particular transaction processor corresponding to the timer).

At 422, if an outage records exists, the outage tracker 418 may retrieve (e.g., using an identifier associated with the transaction processor and corresponding to the time) the outage record stored in outage data store 414. Alternatively, the outage tracker 418 may obtain all or some subset of the outage records stored within outage data store 414. If more than one outage record is obtained, the steps 424-436 may be repeated for each outage record obtained.

At 424, the outage tracker 418 may determine whether the outage is active. By way of example, the outage tracker 418 may determine whether the processing parameters of the outage record indicate the transaction processor is failing to meet one or more expectations as provided by a set of predefined rules associated with the transaction processor. If so, the outage may be marked as active (e.g., an indicator associated with the outage record may be set to a value indicating "active"). For example, the outage tracker 418 may access rules associated with the transaction processor. One such rule could indicate that m number of approved transactions are expected every x number of minutes and that if the number of approved transactions falls below the threshold m, an outage exists. As another non-limiting example, the rules may specify that a response (e.g., approve, decline, etc.) is expected to be received within a time period y and that if a response (or a threshold number of responses, or an average latency associated with the responses with the given time period) exceed a threshold, an outage exists. The outage tracker 418 can compare the processing parameters of the record to identify whether the transaction processor is operating outside of its expected behavior, and if so, then the outage tracker 418 may, in accordance with the rule set, identify the processing parameters as being indicative of an outage and may mark the outage as active within the outage record.

In some embodiments, the transaction data instances may be attributed to an internal error rather than an outage of the transaction processor. By way of example, the outage tracker 418 may be configured to determine whether a threshold percentage of the transaction data instances that were unsuccessful (e.g., have not received a response) or declined originated from a particular department and/or service of the service provider. By way of example, the online retail website may include more than one service. For instance, the online retail website may include a grocery service, a digital streaming service, an online catalog service, and the like. If an unusual number (e.g., over some predefined threshold) of the unsuccessful or declined transactions are attributable to a particular service (e.g., the digital streaming service), the outage tracker 418 may be configured to identify an error in the service rather than an outage of the transaction processor. In these situations, although not depicted in FIG. 4, the outage tracker 418 may stop tracking the outage and cause operations to be performed by the remedial action module 438 such as transmitting a notification of the potential service error to an administrator associated with the service. Thus, internal errors may be differentiated from outages of externals systems such as the transaction processor.

At 426, the outage tracker 418 may invoke the functionality of the outage processing module 406 once again. The steps 428-432 may generally correspond to the steps 408-416. By executing these operations, the outage processing module 406 may update the outage record with the newest transaction data instances (e.g., transaction data instances corresponding to transactions initiated within the last five minutes) as well as the newest processing parameters corresponding to the newest transaction data instances.

At 434, or at any suitable time, the outage tracker 418 may determine whether the outage has continued over some threshold period of time. By way of example, the outage tracker 418 may identify that the outage has continued over 15 minutes and may trigger the functionality of the remedial action module 436 (an example of the remedial action module 314 of FIG. 3) to perform one or more sets of operations. The outage tracker 418 may check to see if any suitable number of thresholds are breached at 434 such that multiple remedial actions may be performed over the lifecycle of the outage.

For example, at 436, when the outage has continued over 15 minutes, the outage tracker 418 may invoke the remedial action module 438 to cause a notification to be sent to a predefined entity (e.g., an administrator associated with the transaction processor). Subsequently, during another invocation of the outage tracker 418, the outage tracker 418 may determine that the outage has now continued for over 30 minutes and as a result, the outage tracker 418 may trigger the functionality of the remedial action module 438 to cause an email to be sent to an administrator of the service provider computer(s) 110 of FIG. 1 including an impact report generated (e.g., by the impact identifier module 316 of FIG. 3) for the outage.

The operations described at 420-436 may be repeated any suitable number of times for as long as the outage is determined to still exist. In some embodiments, when the outage is determined to be inactive at 424, the outage tracker 418 may mark the outage record as inactive (e.g., by setting the indicator to an "inactive" value) and the outage tracker 418 may forgo invoking the functionality of the outage processing module 406. However, in some embodiments, the outage tracker 418 may still invoke the functionality of the remedial action module 438 after determining the outage is inactive. For example, the outage tracker 418 may invoke the remedial action module 438 which in turn may cause an impact report identifying the impact of the outage to be generated (e.g., by the impact identifier module 316).

Figure 5:
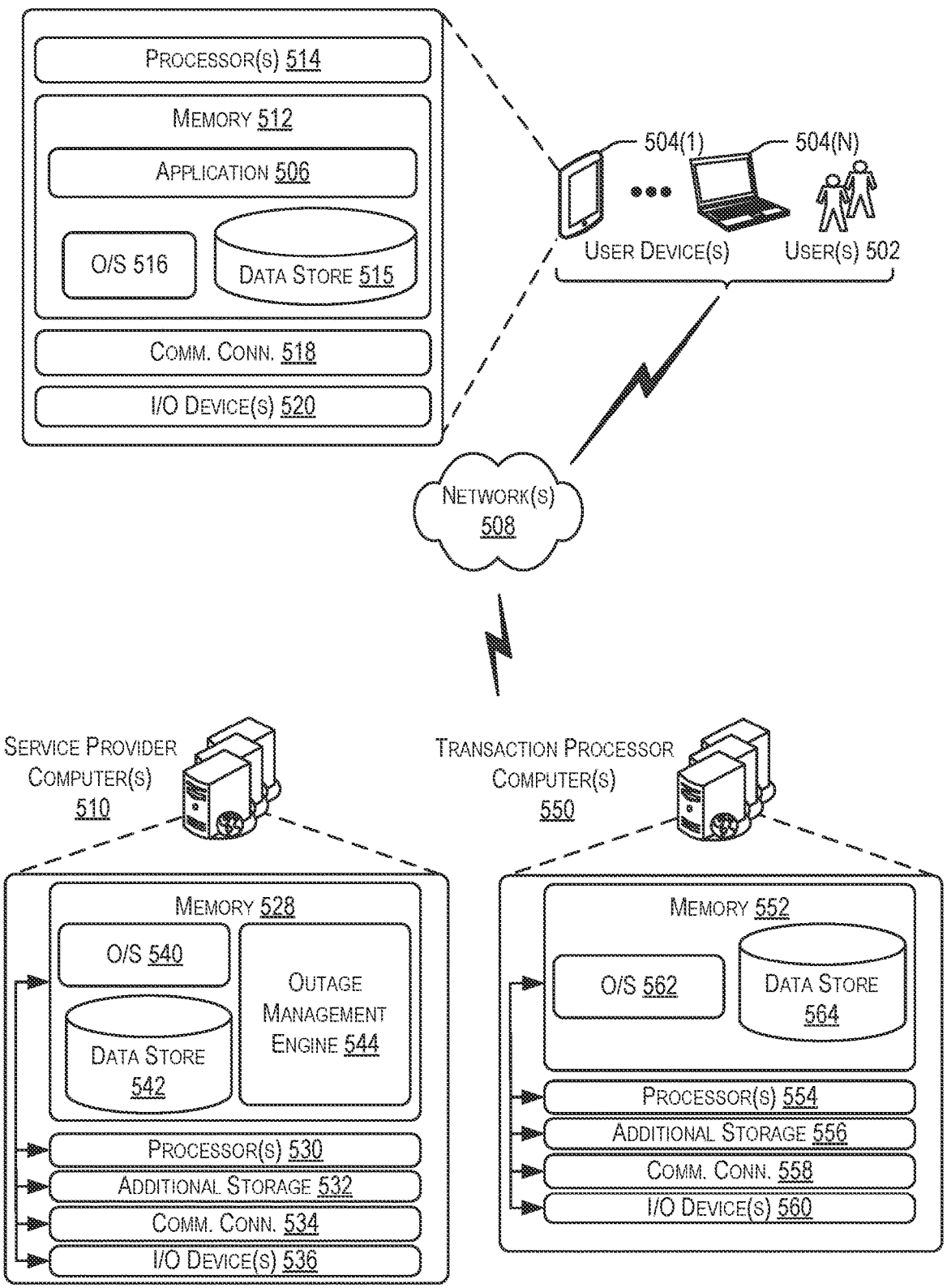
FIG. 5 illustrates components of outage management system according to a particular embodiment.

FIG. 5 illustrates components of an outage management system 500 (referred to as "system 500" herein) according to a particular embodiment. In system 500, one or more users 502 may utilize a user device (e.g., a user device of a collection of user devices 504 to navigate to a network page provided by the service provider computers 510. For example, the user may access a user interface accessible through an application 506 running on the user devices 504 via one or more networks 508. In some aspects, the application 506 operating on the user devices 504 may be hosted, managed, and/or provided by a computing resources service or service provider, such as by utilizing one or more service provider computers 510.

In some examples, the networks 508 may include any one or a combination of many different types of networks, such as cable networks, the Internet, wireless networks, cellular networks, and other private and/or public networks. While the illustrated example represents the users 502 accessing application functionality over the networks 508, the described techniques may equally apply in instances where the users 502 interact with the service provider computers 510 via the one or more user devices 504 over a landline phone, via a kiosk, or in any other suitable manner. It should be appreciated that the described techniques may apply in other client/server arrangements, as well as in non-client/server arrangements (e.g., locally stored applications, etc.).

As described briefly above, the application 506 may allow the users 502 to interact with the service provider computers 510 so as to provide the various functionality described above. For example, a user may utilize the application 506 to browse for various items in an electronic marketplace. In at least one example, the application 506 may provide a network page (e.g., an item detail page) with which the users 502 may view an item and information (e.g., videos, images, descriptive text, etc.) associated with the item. The users 502 may utilize any suitable interface element of the network page provided by application 506 to conduct a transaction for procuring the item. As part of the transaction, transaction data (e.g., any suitable combination of order information, payment instrument data, total price, etc.) is transmitted to the processing system computer(s) 550, operated by or on behalf of a processor (e.g., a payment processor).

The service provider computers 510, perhaps arranged in a cluster of servers or as a server farm, may host the application 506 operating on the user devices 504 and/or cloud-based software services. Other server architectures may also be used to host the application 506 and/or cloud-based software services. The application 506 operating on the user devices 504 may be capable of handling requests from the users 502 and serving, in response, various user interfaces that can be rendered at the user devices 504. The application 506 operating on the user devices 504 can present any suitable type of website that supports user interaction, including search engine sites, item detail pages, and the like. The described techniques can similarly be implemented outside of the application 506, such as with other applications running on the user devices 504.

The user devices 504 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user devices 504 may be in communication with the service provider computers 510 via the networks 508, or via other network connections.

In one illustrative configuration, the user devices 504 may include at least one memory 512 and one or more processing units (or processor(s)) 514. The processor(s) 514 may be implemented as appropriate in hardware, computer-executable instructions, firmware, or combinations thereof. Computer-executable instruction or firmware implementations of the processor(s) 514 may include computer-executable or machine-executable instructions written in any suitable programming language to perform the various functions described.

The memory 512 may store program instructions that are loadable and executable on the processor(s) 514, as well as data generated during the execution of these programs. Depending on the configuration and type of user computing device, the memory 512 may be volatile (such as random access memory (RAM)) and/or non-volatile (such as read-only memory (ROM), flash memory, etc.). The user devices 504 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 512 may include multiple different types of memory, such as static random access memory (SRAM), dynamic random access memory (DRAM), or ROM.

Turning to the contents of the memory 512 in more detail, the memory 512 may include an operating system 514, one or more data stores 515, and one or more application programs, modules, or services. The application 506 may be configured to receive, store, and/or display a network page or other interface for interacting with the service provider computers 510. Additionally, the memory 512 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user devices 504 may also contain communications connection(s) 516 that allow the user devices 504 to communicate with a stored database, another computing device or server (e.g., the service provider computers 510), user terminals and/or other devices on the networks 508. The user devices 504 may also include I/O device(s) 518, such as a keyboard, a mouse, a pen, a voice input device, a touch input device, a display, speakers, a printer, etc.

In some aspects, the service provider computers 510 and the processing system computer(s) 550 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers 510 and/or the processing system computer(s) 550 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computers 510 may be in communication with the user devices 504 and/or the processing system computer(s) 550 via the networks 508 or via other network connections. The service provider computers 510 and the processing system computer(s) 550 may separately include one or more servers, perhaps arranged in a cluster, as a server farm, or as individual servers not associated with one another. These servers may be configured to implement the functionality described herein as part of an integrated, distributed computing environment.

In one illustrative configuration, the service provider computers 510 may include at least one memory 528 and one or more processing units (or processor(s)) 530. The processor(s) 530 may be implemented as appropriate in hardware, computer-executable instructions, firmware, or combinations thereof. Computer-executable instruction or firmware implementations of the processor(s) 530 may include computer-executable or machine-executable instructions written in any suitable programming language to perform the various functions described.

The memory 528 may store program instructions that are loadable and executable on the processor(s) 530, as well as data generated during the execution of these programs. Depending on the configuration and type of service provider computers 510, the memory 528 may be volatile (such as RAM) and/or non-volatile (such as ROM, flash memory, etc.). The service provider computers 510 or servers may also include additional storage 532, which may include removable storage and/or non-removable storage. The additional storage 532 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 528 may include multiple different types of memory, such as SRAM, DRAM, or ROM.

The memory 528, the additional storage 532, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 528 and the additional storage 532 are all examples of computer storage media. Additional types of computer storage media that may be present in the service provider computers 510 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 510. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 510 may also contain communications connection(s) 534 that allow the service provider computers 510 to communicate with a stored database, another computing device or server, user terminals and/or other devices on the networks 508. The service provider computers 510 may also include I/O device(s) 536, such as a keyboard, a mouse, a pen, a voice input device, a touch input device, a display, speakers, a printer, etc.

Turning to the contents of the memory 528 in more detail, the memory 528 may include an operating system 540, one or more data stores 542, and/or one or more application programs, modules, or services for implementing the features disclosed herein, such as the features provided by the outage management engine 544 (an example of the outage management engine 300 of FIG. 3).

In one illustrative configuration, the processing system computer(s) 550 may include at least one memory 552 and one or more processing units (or processor(s)) 554. The processor(s) 554 may be implemented as appropriate in hardware, computer-executable instructions, firmware, or combinations thereof. Computer-executable instruction or firmware implementations of the processor(s) 554 may include computer-executable or machine-executable instructions written in any suitable programming language to perform the various functions described.

The memory 552 may store program instructions that are loadable and executable on the processor(s) 554, as well as data generated during the execution of these programs. Depending on the configuration and type of processing system computer(s) 550, the memory 552 may be volatile (such as RAM) and/or non-volatile (such as ROM, flash memory, etc.). The processing system computer(s) 550 may also include additional storage 556, which may include removable storage and/or non-removable storage. The additional storage 556 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 552 may include multiple different types of memory, such as SRAM, DRAM, or ROM.

The memory 552, the additional storage 556, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 552 and the additional storage 556 are all examples of computer storage media. Additional types of computer storage media that may be present in the processing system computer(s) 550 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the processing system computer(s) 550. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The processing system computer(s) 550 may also contain communications connection(s) 558 that allow the processing system computer(s) 550 to communicate with a stored database, another computing device or server, user terminals and/or other devices on the networks 508. The processing system computer(s) 550 may also include I/O device(s) 560, such as a keyboard, a mouse, a pen, a voice input device, a touch input device, a display, speakers, a printer, etc.

Turning to the contents of the memory 552 in more detail, the memory 552 may include an operating system 562, one or more data stores 564, and/or one or more application programs, modules, or services for processing transaction data received from service provider computer(s) 510 (or any suitable computing device configured to host the online retail website).

FIG. 6 is a flowchart illustrating an example method 600 for detecting and managing a processing system outage (e.g., an outage associated with a processing entity and/or the processing system computer(s) 550), in accordance with at least one embodiment. A computer-readable medium may store computer-executable instructions that, when executed by at least one processor, cause at least one computer to perform instructions comprising the operations of the method 600. It should be appreciated that the operations of the method 600 may be performed in any suitable, not necessarily the order depicted in FIG. 6. Further, the method 600 may include additional, or fewer operations than those depicted in FIG. 6. The operations of method 600 may be performed by the outage management engine 300 of FIG. 3. In some embodiments, the outage management engine 300 may execute on service provider computer(s) 510 of FIG. 5.

The method 600 may begin at 602, where an indication of a potential outage associated with a transaction processor computer (e.g., the processing computer(s) 114 of FIG. 1) may be received by an outage management system (e.g., by the outage management engine 300 of FIG. 3). In some embodiments, the transaction processor computer may be associated with a transaction processor (e.g., a financial institution) and configured to process transaction data associated with an online retail website (e.g., a retail website from which the transaction was initiated). In some embodiments, the indication of the potential outage is received from at least one of a threshold-based monitoring system (e.g., the threshold monitoring module 322 of FIG. 3) configured to monitor transactions of the online retail website or from a machine-learning detection system (e.g., ML processing module 320) configured to utilize a machine-learning model trained to detect anomalies in the processing of the transactions of the online retail website.

At 604, in response to receiving the indication of the potential outage, a subset of transaction data instances may be identified (e.g., by the outage processing module 310 of FIG. 3) from a plurality of transaction data instances. In some embodiments, the transaction data instances of the subset may be identified using a predefined time filter. For example, the subset of transaction data instances may include only the transactions that were initiated within a time period specified by the time filter (such as transactions initiated within the last five minutes).

At 606, a number of transaction data instances that were successfully processed by the transaction processor computer may be determined (e.g., by the outage processing module 310) from the subset of transaction data instances. In some embodiments, successfully processed may include determining a number of approved transactions and/or a number of declined transactions from the subset of transaction data instances. Thus, successfully processed may refer to whether a response was received for a transaction data instance rather than an assessment as to whether the transaction was approved or declined.

At 608, a determination may be made (e.g., by the outage processing module 310) as to whether the number of transaction data instances that were successfully processed by the transaction processor computer breaches a predefined threshold. The predefined threshold may be one of a set of predefined thresholds that are associated with the transaction processor and which individually specify some aspect of expected processing behavior.

At 610, a determination may be made (e.g., by the outage processing module 310) that that the transaction processor is experiencing an outage based at least in part on identifying that the number of transaction data instances that were successfully processed breached the predefined threshold.

At 612, in response to determining that the transaction processor is experiencing the outage, a tracking process for tracking the outage may be initiated (e.g., by the outage processing module 310). By way of example, the outage processing module 310 may set a timer that, upon expiring invokes the functionality discussed above with respect to an outage tracking module (e.g., the outage tracking module 312 of FIG. 3, the outage tracker 418 of FIG. 4).

At 614, in response to determining, based at least in part on the tracking, that the outage has breached an additional predefined threshold, one or more operations comprising at least transmitting a notification that the outage has breached the additional predefined threshold may be performed (e.g., by the remedial action module 438, an example of the remedial action module 314 of FIG. 3).

Figure 7:
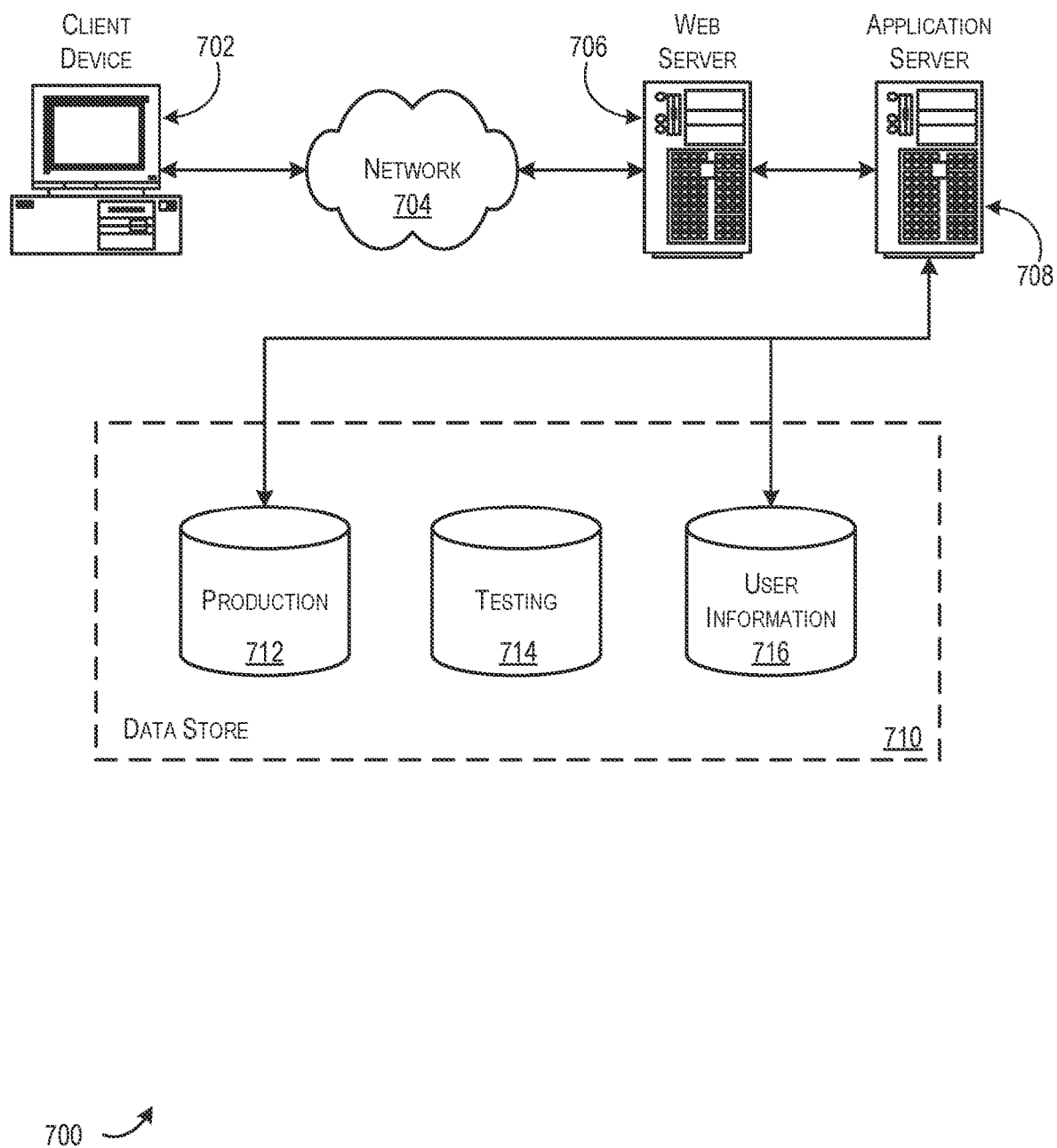
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, by an outage management system from a machine-learning model, an indication that an outage associated with a transaction processor computer is likely occurring, the transaction processor computer being associated with a transaction processor that processes transaction data comprising financial transactions initiated from an online retail website, the machine-learning model being previously trained utilizing a supervised machine-learning algorithm and a training data set comprising transaction data instances to identify, from corresponding transaction data instances provided as input, a corresponding indication that a respective outage is occurring at a respective transaction processor computer, each of the transaction data instances of the training data set being associated with a respective label that indicates whether a respective transaction data instance indicates a corresponding outage of a corresponding transaction processor computer;
   in response to receiving the indication of the outage, identifying, by the outage management system, a subset of transaction data instances from a plurality of transaction data instances, each of the transaction data instances of the subset being identified using a predefined time filter;
   determining, by the outage management system, from the subset of transaction data instances, a number of transaction data instances that were successfully processed by the transaction processor computer;
   determining, by the outage management system, whether the number of transaction data instances that were successfully processed by the transaction processor computer breached a predefined threshold;
   determining, by the outage management system, that the transaction processor is experiencing the outage based at least in part on identifying that the number of transaction data instances that were successfully processed breached the predefined threshold;
   in response to determining, by the outage management system, that the transaction processor is experiencing the outage, generating an outage record for the outage and initiating a computing agent that tracks the outage based at least in part on the outage record; and
   in response to determining, by the outage management system and based at least in part on the outage record, that the outage has breached an additional predefined threshold, performing, by the outage management system, one or more operations comprising at least transmitting a notification that the outage has breached the additional predefined threshold.

2. The computer-implemented method of claim 1, further comprising assessing a severity of the outage based at least in part on one or more additional thresholds associated with the transaction processor, wherein additional or different operations are performed based at least in part on the severity of the outage.

3. The computer-implemented method of claim 2, further comprising:
   storing a mapping for a plurality of transaction processors, the mapping identifying respective predefined thresholds associated with the plurality of transaction processors, the mapping providing an association between the predefined threshold and the transaction processor; and
   identifying the predefined threshold from the respective predefined thresholds associated with the plurality of transaction processors, the predefined threshold being identified utilizing the mapping.

4. The computer-implemented method of claim 1, wherein the outage is further identified based at least in part on exceeding a latency threshold associated with the transaction processor, the latency threshold indicating an amount of latency associated with receiving one or more responses corresponding to one or more historic transactions.

5. An outage management system, comprising:
   one or more processors; and
   one or more memories storing first computer-executable instructions associated with a detection component that, when executed by the one or more processors of the outage management system, causes the one or more processors to:
      detect a potential outage associated with a transaction processor computer that processes transaction data corresponding to a plurality of computing services associated with an online retail website, the transaction processor computer being associated with a transaction processor; and
      initiate and assign a computing agent to the potential outage; and
   wherein the one or more memories further store second computer-executable instructions associated with the computing agent that, when executed by the one or more processors, further causes the one or more processors to:
      obtain, using a machine-learning model, an indication of the potential outage associated with the transaction processor computer, the machine-learning model being previously trained utilizing a supervised machine-learning algorithm and a training set comprising transaction data instances to identify, from corresponding transaction data instances provided as input, a corresponding indication that a respective outage is occurring at a respective transaction processor computer, each of the transaction data instances of the training set being associated with a respective label that indicates whether a respective transaction data instance indicates a corresponding outage of a corresponding transaction processor computer;
      determine whether subsequent transaction data is being processed in accordance with one or more predefined processing parameters;
      generate, by the computing agent, an outage record indicating an outage is occurring based at least in part on identifying that the transaction processor computer failed to process the subsequent transaction data in accordance with the one or more predefined processing parameters associated with the transaction processor; and
      in response to determining, based at least in part on tracking the outage using the outage record, that the outage has continued over a threshold period of time, performing one or more operations comprising at least transmitting a notification that the outage has continued over the threshold period of time.

6. The outage management system of claim 5, wherein the one or more predefined processing parameters comprise at least one of: a minimum number of successfully processed transactions expected in a predefined time interval, an approval rate corresponding to the subsequent transaction data, a decline rate corresponding to the subsequent transaction data, a pending rate corresponding to the subsequent transaction data, a latency value corresponding to processing the subsequent transaction data, or a risk assessment score corresponding to the subsequent transaction data.

7. The outage management system of claim 6, wherein the computing agent is one of a plurality of virtual computing resources individually assigned to respective outages.

8. The outage management system of claim 5, wherein the one or more memories further store third computer-executable instructions that, when executed by the one or more processors, further causes the one or more processors to obtain one or more metrics associated with a set of transactions associated with the transaction processor and corresponding to a predefined time interval, wherein identifying that the transaction processor computer failed to process the subsequent transaction data in accordance with the one or more predefined processing parameters associated with the transaction processor is based at least in part on the one or more metrics obtained.

9. The outage management system of claim 8, wherein executing the second computer-executable instructions associated with the computing agent further causes the one or more processors to:
   identify that one or more failed transactions of the subsequent transaction data correspond to a particular computing service of the plurality of computing services;
   determine that a number corresponding to the one or more failed transactions breaches a predefined threshold; and
   transmit a second notification that the particular computing service is experiencing a failure.

10. The outage management system of claim 5, wherein executing the second computer executable instructions associated with the computing agent further causes the one or more processors to:
   store subsequent transaction data over time as historical transaction data;
   determine actual processing parameters that describe historical behavior of the transaction processor based at least in part on the historical transaction data; and
   adjust the one or more predefined processing parameters based at least in part on the actual processing parameters corresponding to the historical behavior of the transaction processor.

11. The outage management system of claim 5, wherein executing the second computer executable instructions associated with the computing agent further causes the one or more processors to:

obtain one or more latency values corresponding to the subsequent transaction data; and identify the outage is ongoing based at least in part on identifying the one or more latency values, alone or in combination, exceed a respective latency threshold.

12. The outage management system of claim 5, wherein the one or more predefined processing parameters are obtained from a predefined mapping stored by the outage management system, the predefined mapping comprising one or more entries, an entry of the one or more entries indicating an association between a set of predefined processing parameters and a particular transaction processor.

13. The outage management system of claim 5, wherein executing the second computer-executable instructions further causes the one or more processors to identify one or more values that quantifies an impact of the outage.

14. A non-transitory computer-readable storage medium having stored thereon computer-executable instructions that, when executed by a processor of a computing device, causes the computing device to perform operations comprising:

obtaining, by a service associated with an online retail website from a machine-learning model, an indication that an outage of a transaction processor computer is likely occurring, the transaction processor computer being associated with a transaction processor, the transaction processor computer processing transaction data associated with a plurality of transactions, the machine-learning model being previously trained utilizing a supervised machine-learning algorithm and a training set comprising transaction data instances to identify, from corresponding transaction data instances provided as input, a corresponding indication that a respective outage is occurring at a respective transaction processor computer, each of the transaction data instances of the training set being associated with a respective label that indicates whether a respective transaction data instance indicates a corresponding outage of a corresponding transaction processor computer;

in response to receiving the indication of the outage, confirming existence of the outage at least in part on identifying that the transaction processor computer has failed to process historic transaction data in accordance with a predefined parameter associated with the transaction processor;

tracking the outage utilizing subsequent transaction data, wherein tracking the outage comprises generating an outage record and initiating a computing agent to track the outage using the outage record; and based at least in part on the tracking of the outage by the computing agent using the outage record, performing one or more remedial actions to resolve the outage, the one or more remedial actions being identified based at least in part on a predefined set of remedial actions associated with the transaction processor.

15. The non-transitory computer-readable storage medium of claim 14, wherein executing the computer-executable instructions by the processor, further causes the computing device to perform operations comprising:

identifying a timing interval;

obtaining the subsequent transaction data from a collection of transaction data using the timing interval;

storing the subsequent transaction data in the outage record.

16. The non-transitory computer-readable storage medium of claim 14, wherein tracking the outage comprises:

repeatedly collecting recent transaction data according to a predefined periodicity, and storing collected sets of transaction data in the outage record, the outage record being associated with an identifier that uniquely identifies the outage and a timestamp corresponding to a time of collection of the collected sets of transaction data.

17. The non-transitory computer-readable storage medium of claim 14, wherein executing the computer-executable instructions by the processor, further causes the computing device to perform operations comprising:

obtaining a plurality of metric values corresponding to approvals, denials, pending transactions, and latency of a number of recent transactions processed by the transaction processor;

comparing each metric value to a corresponding processing parameter of the one or more processing parameters; and determine the outage exists based at least in part on detecting that at least one metric value breaches a threshold defined by the corresponding processing parameter.

18. The non-transitory computer-readable storage medium of claim 14, wherein executing the computer-executable instructions by the processor, further causes the computing device to perform operations comprising:

identifying when the transaction processor has reverted to processing transactions in accordance with the one or more processing parameters; and updating the outage record to indicate the outage is inactive.

\* \* \* \* \*